United States Patent [19]

Wilson

[11] 4,253,445
[45] Mar. 3, 1981

[54] CONCENTRATING VACUUM INSULATED SOLAR ENERGY COLLECTION APPARATUS

[76] Inventor: Pryce Wilson, 2510-1/2 N. 7th St., Phoenix, Ariz. 85018

[21] Appl. No.: 31,467

[22] Filed: Apr. 19, 1979

[51] Int. Cl.$^3$ ............................................. F24J 3/02
[52] U.S. Cl. ................................ 126/422; 126/435; 126/437; 126/443; 126/450
[58] Field of Search ............... 126/417, 419, 421, 422, 126/432, 434, 435, 436, 437, 443, 445, 450

[56] References Cited

U.S. PATENT DOCUMENTS

| | | | |
|---|---|---|---|
| 1,162,505 | 11/1915 | Nichols | 126/425 |
| 1,946,184 | 2/1934 | Abbot | 126/424 |
| 2,803,591 | 4/1954 | Coanda et al. | 126/424 |
| 3,118,437 | 1/1964 | Hunt | 126/424 |
| 3,847,136 | 11/1974 | Salvail | 126/424 |
| 3,972,316 | 8/1976 | Alkasab | 126/417 |
| 4,000,734 | 1/1977 | Matlock | 126/425 |
| 4,051,890 | 10/1977 | Melchior | 126/417 |
| 4,062,349 | 12/1977 | Birnbreier | 126/422 |
| 4,081,289 | 3/1978 | Campbell | 126/443 |
| 4,084,580 | 4/1978 | Roark | 126/435 |
| 4,086,911 | 5/1978 | Futch | 126/443 |
| 4,112,920 | 9/1978 | Hillman | 126/437 |
| 4,121,568 | 10/1978 | Olsen | 126/422 |
| 4,129,118 | 12/1978 | Banke | 126/422 |
| 4,136,668 | 1/1979 | Davis | 126/430 |
| 4,137,903 | 2/1979 | Annett | 126/443 |

FOREIGN PATENT DOCUMENTS 2802411 1/1978 Fed. Rep. of Germany ........... 126/443

Primary Examiner—James C. Yeung
Assistant Examiner—Daniel O'Connor
Attorney, Agent, or Firm—Warren F. B. Lindsley

[57] ABSTRACT

A concentrating vacuum insulated solar energy collecting and converting apparatus employing transfer means for selectively moving the collected energy back through the vacuum preservation means for useful purposes.

9 Claims, 11 Drawing Figures

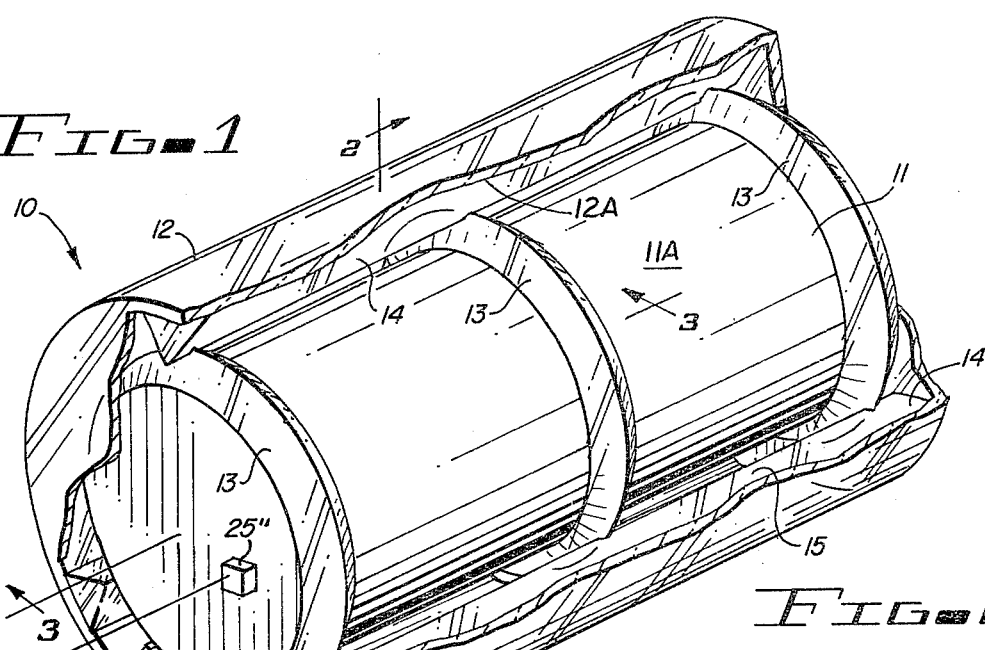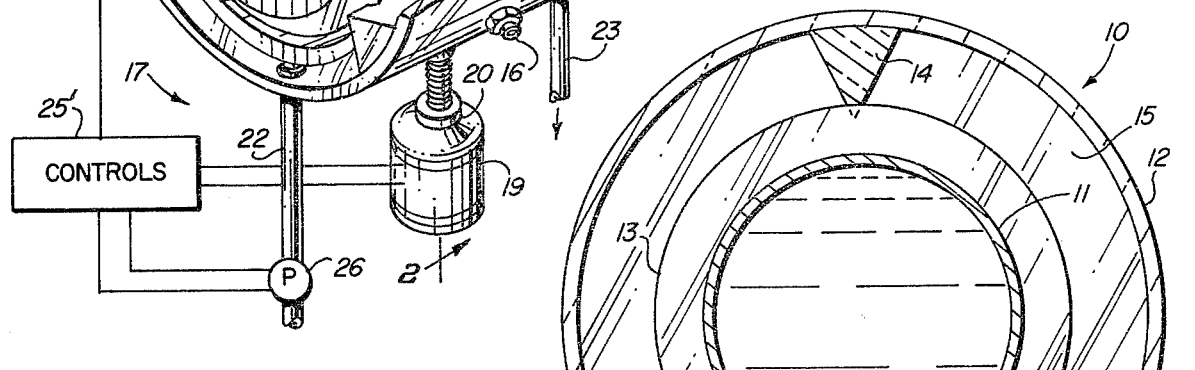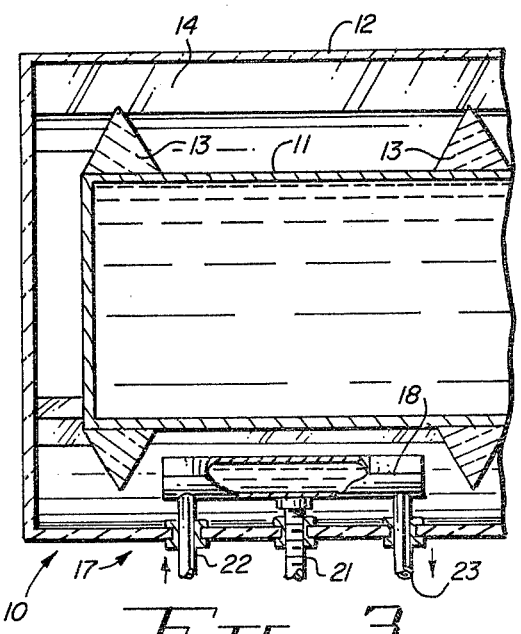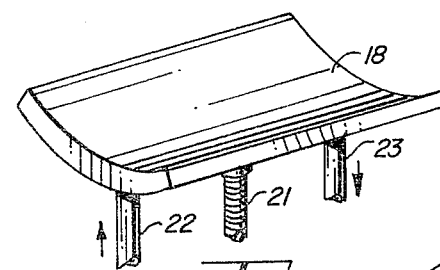

CONCENTRATING VACUUM INSULATED SOLAR ENERGY COLLECTION APPARATUS

BACKGROUND OF THE INVENTION

The rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is made of metal and glass with one or more layers of glass laid over a blackened metal plate. Air spaces are provided between the layers of glass and air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

PRIOR ART

Parabolic reflectors have been utilized in the past along with sun-tracking mechanisms in connection with various schemes for the collection, conversion and utilization of solar energy. Variations of such equipment are described in U.S. Pat. Nos. 1,162,505; 2,803,591; 3,118,437 and 4,000,734.

Heretofore, heat exchangers, particularly of the type adapted to collect cold or heat, have been constructed either with a series of tubes embedded in a flat reflective surface or have comprised a curved or semi-cylindrical reflector with a round tube mounted at approximately its focal point with U.S. Pat. Nos. 1,946,184 and 3,847,136 being representative thereof. Relative to this latter form of the prior art, fins or vanes have been mounted about the tube in an effort to obtain more efficiency from the unit.

At best, the prior art heat exchangers have been extremely inefficient even to the point where it is necessary to incorporate thereinto an elaborate system of gears and racks or other means to shift or otherwise change the positions of the exchange or collector unit so that its relative position to the source of heat will remain constant.

While such prior art inventions do suggest workable approaches for the realization of the important objectives involved, the particular implementations described in these patents have in general fallen short of what is required in a low-cost and practical system.

SUMMARY OF THE INVENTION

In accordance with the invention claimed, an improved vacuum insulated solar energy collecting and converting apparatus is provided which is compact and inexpensive by virtue of its uniquely designed configuration.

It is, therefore, one object of this invention to provide an improved vacuum insulated heat energy accumulator, storage and converting apparatus which employs means for selectively retrieving the collected and converted energy through a vacuum insulating shield.

Another object of this invention is to provide a compact and inexpensive solar energy collecting apparatus employing a novel means for supporting a vacuum enveloping shield around the energy collecting structure.

A further object of this invention is to provide such an inexpensive solar energy collector structure which achieves maximum energy collection throughout the day without the need of an expensive solar tracking mechanism.

A still further object of this invention is to provide a novel heat retrieving mechanism which selectively transmits this form of energy back through the vacuum with little or no radiational loss thereof.

Further objects and advantages of this invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a cylindrically shaped solar energy collector insulated in a vacuum shield and embodying the invention;

FIG. 2 is a cross-sectional view of FIG. 1 taken along the line 2—2;

FIG. 3 is a cross-sectional view of FIG. 1 taken along line 3—3;

FIG. 4 is a perspective view of the energy retrieving shoe shown in FIGS. 1, 2 and 3;

DESCRIPTION OF THE PREFERRED EMBODIMENT

Figure 5:
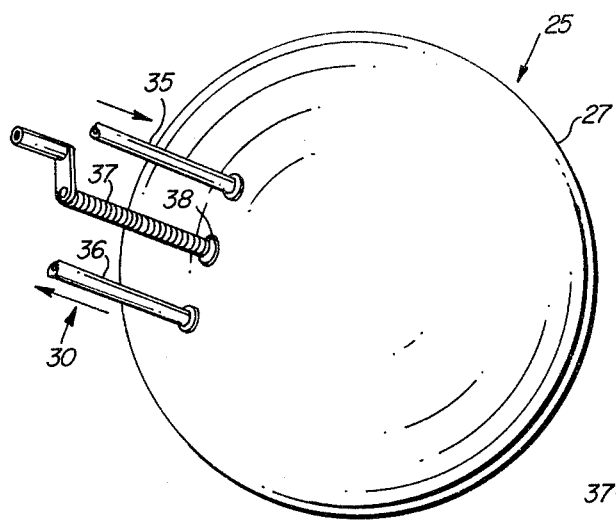
FIG. 5 is a modification of the cylindrically shaped solar energy collector shown in FIGS. 1-4 wherein the solar collector comprises a spherical configuration.

Referring more particularly to the drawing by characters of reference, FIGS. 1-4 disclose a solar energy collection and conversion apparatus 10 utilizing a pair of coaxially arranged spacedly positioned close ended cylinders 11 and 12 which are maintained in this spaced arrangement by a plurality of intersecting spacers 13 and 14. These spacers as shown more clearly in FIGS. 2 and 3 comprise triangular configurations the apexes of which intersect in a lateral manner so as to maintain between the outer surface 11A of cylinder 11 and the inner surface 12A of cylinder 12 a space 15 which is maintained in a suitable vacuum condition by withdrawing the air or atmosphere therebetween by a suitable vacuum pump (not shown) through a suitable valve 16. The spacers may comprise anticline and syncline configurations.

The spacers 13 and 14 maintain the two cylinders 11 and 12 in a given spaced arrangement but each spacer, strut or separating means forms a conductive path for the flow of energy, i. e. heat, cold or the like from one wall or surface of one cylinder to the wall or surface of the other cylinder and vice versa across the space 15.

Accordingly, the number of spacers and their design configuration should be so configured to limit and control the number of such paths and the size thereof to control the energy flow therealong. The A-shaped configuration of the spacers 13 and 14 provides a strong support for the closely positioned walls while limiting the energy flow paths through the spacers between the cylinders. It should be noted that the apexes of the spacers 13 engage the apexes of the spacers 14. This limited substantially line or limited area contact between the spacers greatly limits the energy flow path between the cylinders and thereby preserves the energy of the retaining cylinder.

In the embodiment shown in FIGS. 1, 2, and 3 the inner cylinder 11 is intended to contain a suitable medium which may be water or any other fluid filling or partially filling cylinder 11 which is intended to be heated by the sun's rays penetrating the walls of the outer cylinder and the vacuum space 15 and impinging on the walls of the cylinder 11. The walls of cylinder 11 may be transparent or of black absorbing character so that by absorption, conduction or otherwise the rays of the sun may be absorbed by the cylinder walls and the medium inside of it and converted into heat energy. If so desired, part of the walls of cylinder 11 may be transparent or opaque as desired.

The outer cylinder 12 may be fully or partially transparent. For example, at least 50 percent of the top of the cylinder as shown may be transparent so as to readily pass through its walls to the inner cylinder the sun's rays and the balance of its inside periphery may be reflective so as to reflect any of the sun's rays that miss the inner cylinder back to it.

Thus, the inner cylinder becomes a heat absorber, intensifier or accumulator with little if any loss of its heat by radiation or conduction since it is encased in a vacuum. It should be noted that the inner cylinder continues to accumulate heat since very little is lost through the spacers 13 and 14.

In order to retrieve the heat energy from the inner cylinder when needed an energy transfer means 17 is provided. This transfer means may comprise any suitable means but for purpose of illustration is shown as a brake shoe like structure 18 arranged within the space 15 between the cylinders 11 and 12 which is reciprocally mounted so as to engage with the outer periphery of cylinder 11 and move away therefrom. One suitable means for moving the shoe-like structure 18 into engagement with cylinder 11 and away therefrom may comprise an unattached elecric motor 19 the rotor 20 of which is threadedly connected by means of a shaft 21 through the walls of the outer configuration 12. Rotation of motor 19 in one direction causes the shoe-like structure 18 to engage the outer periphery of the inner cylinder 11 and through conduction transfer the heat energy of the medium of cylinder 11 into the shoe-like structure 18 and through the bearing and guiding shafts, flexible hoses or pipes 22 and 23 of the transfer means 17 to a heat utilization apparatus (not shown).

As shown in FIGS. 2, 3 and 4, the shoe-like structure may be of an arcuate configuration so that it conforms to the outer surface of the inner cylinder when in engagement therewith.

In order to more readily transfer the heat of the inner cylinder 11 to a heat utilizing means, the shoe-like structure 18 is shown as a hollow configuration through which water or other fluid flows by means of pipes 22 and 23 absorbing by conduction the heat of cylinder 11 and transporting this heat through the vacuum space 15 to the outside world.

Figure 6:
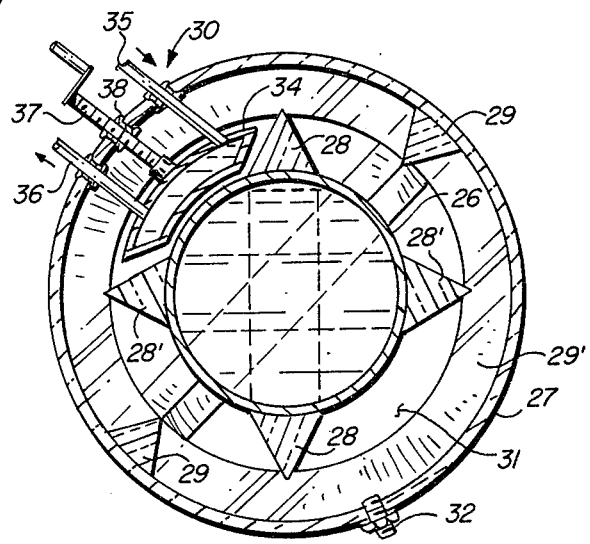
FIG. 6 is a cross-sectional view of FIG. 5.

Although a motorized means is used to move the shoe-like structure to and from cylinder 11, it should be recognized that a suitable hand lever or crank may be used, if so desired, in the manner shown in FIG. 6.

The controls 25' for the transfer means 17 selectively control the direction of rotation of motor 19 and the operation of pump 26 which circulates water through the shoe-like structure 18 when the structure is in engagement with the outer periphery of the inner cylinder 11.

It should be recognized that although two coaxial cylinders 11 and 12 are shown, these cylinders may be one within the other but not coaxially aligned and still fall within the scope of this invention. Further, the cylinders could be replaced by any other geometrical configuration such as, for example, hollow right prisms.

FIGS. 5-8B illustrate a further modification of the structures shown in FIGS. 1-4 wherein a solar energy collection apparatus or device 25 is disclosed comprising a pair of concentric hollow spheres 26 and 27 held apart in a spaced arrangement by a plurality of spacers 28, 28' and 29, 29' similar to those shown in FIGS. 1-4 with spacers 28, 28' being arranged on the outer periphery of the inner sphere 26 and spacers 29, 29' being arranged on the inner periphery of sphere 27. These spacers are triangular, prism, anticline or syncline configurations which are intended to limit the energy flow from sphere 26 to sphere 27.

An energy transfer means 30 is provided for selectively conducting the absorbed solar energy received by sphere 26 to and through a vacuum space 31 created by a suitable vacuum pump (not shown) operating in the usual manner through a valve 32 formed in the shell of sphere 27.

It should be noted that part or all of the shell of sphere 27 may be transparent with the surface of sphere 26 being partially or all transparent or opaque as desired. If the material 33 inside of sphere 26 is dark liquid, for example, the walls of sphere 26 may be transparent, however, if the liquid is water then the wall of the sphere may be opaque such as a black color for more readily absorbing the solar rays.

The energy transfer means 30 functions similar to transfer means 17 of FIGS. 1-4 and employs a hollow shoe-like structure 34 formed in a substantially convex spherical polygon or triangular arcuate configuration the hollow interior of which is connected to a suitable fluid under pressure by pipes 35 and 36. A shaft 37 in threaded engagement with a collar 38 and actuated by a crank 39 may selectively move the shoe-like structure 34 into and away from surface contact with the outer periphery of sphere 26.

Figure 7A:
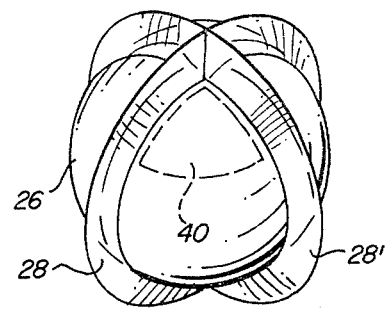
FIG. 7A is a perspective view illustrating the triangular separating means mounted around the outer periphery of inner fluid containing sphere shown in FIG. 6.
Figure 7B:
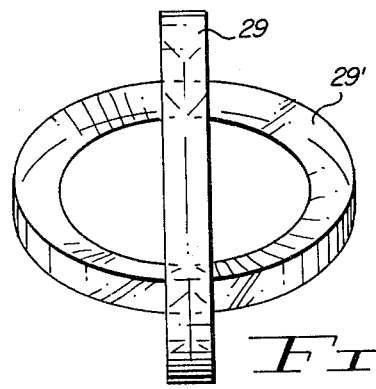
FIG. 7B is a perspective view of the triangular separating means mounted on the inner surface of the outer sphere shown in FIG. 6.

It should be noted that the dash line image 40 in FIG. 7A indicates the area of engagement of the shoe-like structure 34 on the surface of sphere 26.

Figure 9:
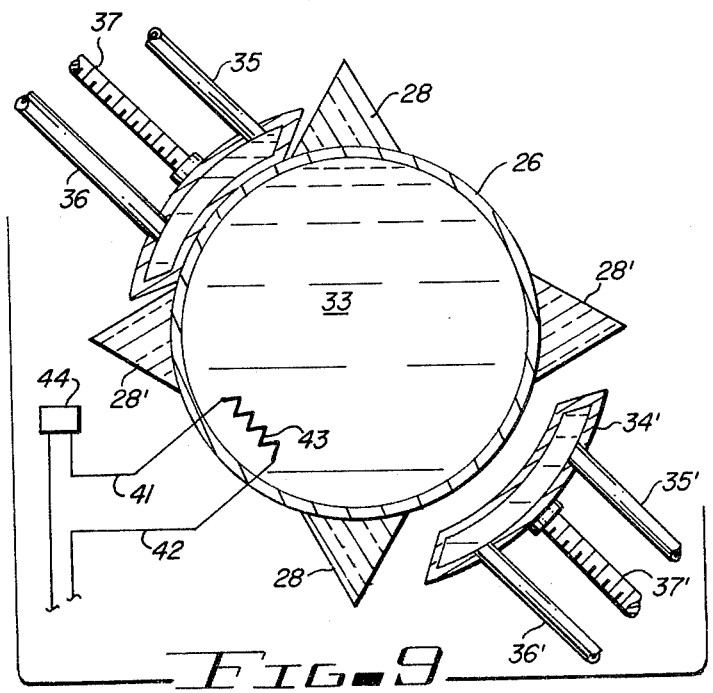
FIG. 9 is a modification of the spherical solar ray collecting apparatus shown in FIGS. 5 and 6 employing two heat retrieving means one of which may involve electrical heating and retrieving means.
Figure 8A:
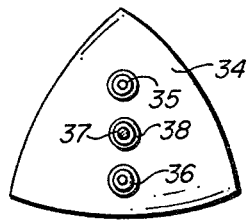
FIG. 8A is a plan view of the external surface of the heat transfer means shown in FIG. 6.
Figure 8B:
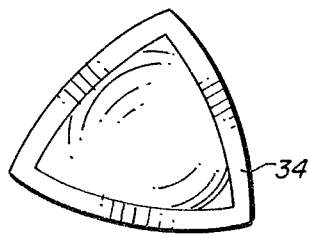
FIG. 8B is a plan view of the inner sphere engaging surface of the heat transfer means shown in FIG. 6.

FIG. 9 is a partial view of a further modification of the structure shown in FIGS. 5-8B differing by illustrating a second shoe-like configuration 34' and its component parts having the same reference numerals except primed as utilized to provide more than one energy retrieving means.

Additionally, this shoe-like configuration 34' may be an electrical switching means for connecting two conductors 41,42 connected to a suitable source of electric power across a heating resistance 43 arranged within the hollow interior of cylinder 33. A solar ray sensor connected thereto could be used to energize the heating resistance when the sun is not shining enough to heat the inner object sufficiently.

Energization of the resistance 43 will also provide a way to heat the contents of cylinder 33 so that heat may be stored in cylinder 33, as desired from a public utility at a time when the rates are the lowest and used when needed such as during cloudy days when solar energy is not available or to boost a dissipated stored solar energy supply.

This form of electrical heating means for cylinder 33 could readily be applied to cylinder 11 of FIG. 1 and is intended to be covered by this invention.

It should also be noted that cylinders 11 and 33 could be of solid material and could accumulate energy from the sun until their melting point if the vacuum surrounding them could be maintained.

To eliminate a too high stored energy level of either the inner cylinder 11 or sphere 33 whether it comprises a solid member or is hollow containing a suitable fluid, suitable controls such as controls 25' shown in FIGS. 1 and 2 but readily adaptable for the structures shown in FIGS. 5-9 may be used to move the shoe-like configurations 18, 34 and 34' into contact with the inner cylinders 11 and sphere 33 when a sensor 25" of it in contact with the inner cylinder or sphere actuates it to bleed off excess heat. This excess heat can be then transmitted to a suitable storage device outside of the heat exchange means 10 and 25. Also a cover could be mounted over at least a part of apparatus 10 and 25 to selectively shade the apparatus from the sun if the temperature noted by sensor 25" of the inner cylinder or sphere becomes too hot.

Further, it should be noted that an external source of heat may be used such as, for example, a waste steam byproduct, geothermal energy and other forms which may be conducted through the shoe-like configuration 18 and 34 when in contact with cylinder 11 or sphere 33 for heating the inner cylinder 11 and sphere whether hollow containing a liquid or solid. When heated, the inner cylinder or sphere then may serve as a source of heat for use in the manner disclosed.

Accordingly, a new and improved solar collector is provided which, inter alia, may be formed of any suitable material which not only captures the solar energy but maintains it in a substantially vacuum isolated condition until needed and then may be easily retrieved.

Although but a few embodiments of the invention have been illustrated and described, it will be apparent to those skilled in the art that various changes and modifications may be made therein without departing from the spirit of the invention or from the scope of the appended claims.

What is claimed is:

1. An improved heat exchange means comprising:
   a pair of concentrically arranged inner and outer spaced, closed objects,
   said inner object comprising a material to be heated by solar rays impinging on at least a part of its outer periphery,
   the space between said objects containing less than atmospheric pressure therein,
   the periphery of said outer object being at least partially transparent for transmitting solar rays to said inner object,
   an energy transfer means arranged within the space between said objects for selectively moving into contact with and away from the outer periphery of said inner object,
   said energy transfer means comprising a hollow configuration having input and output fluid bearing pipe means for conducting fluid through said hollow configuration for heat absorption by the fluid flowing therethrough when said energy transfer means is in contact with said inner object, and
   a control means for selectively controlling the movement of said energy transfer means.

2. The improved heat exchange means set forth in claim 1 in further combination with:
   spacer means arranged on the periphery of at least one of said objects for holding said objects in spaced arrangement and forming substantially a limited contact between said objects for controlling energy flow between said objects,
   said spacer means comprising at least a pair of closed ended triangular members,
   one of said members having its base secured to the outer periphery of said inner object and the other of said members having its base secured to the inner periphery of said outer object,
   said members extending around the associated object forming a closed configuration and one positioned to pass laterally of the other so that their apexes intersect.

3. The improved heat exchange means set forth in claim 1 wherein:
   said objects comprise cylindrical configurations.

4. The improved heat exchange means set forth in claim 1 wherein:
   said objects comprise spheres.

5. The improved heat exchange means set forth in claim 1 wherein:
   said control means comprises a reversable electric motor arranged outside of said outer configuration.

6. The improved heat exchange means set forth in claim 3 wherein:
   said energy transfer means comprises an elongated arcuate configuration having a curvature substantially identical to the periphery of the surface of the inner object with which it contacts.

7. The improved heat exchange means set forth in claim 4 wherein:
   said energy transfer means comprises a convex spherical polygon having a curvature substantially identical to the periphery of the surface of the inner object with which it contacts.

8. The improved heat exchange means set forth in claim 1 wherein:
   said inner object comprises a hollow configuration.

9. The improved heat exchange means set forth in claim 1 wherein:
   said control means comprises a sensor connected to said inner object for moving said energy transfer means into contact with said inner object when its temperature reaches a predetermined value for transferring away from it excess heat.

* * * * *